UNITED STATES PATENT OFFICE.

WILLIAM E. CARSON, OF RIVERTON, VIRGINIA.

COLD-WATER PAINT AND PROCESS OF MAKING SAME.

1,390,496. Specification of Letters Patent. Patented Sept. 13, 1921.

No Drawing. Application filed October 9, 1919. Serial No. 329,431.

*To all whom it may concern:*

Be it known that I, WILLIAM E. CARSON, a citizen of the United States, residing at Riverton, in the county of Warren and State of Virginia, have invented certain new and useful Improvements in Cold-Water Paints and Processes of Making Same, of which the following is a specification.

This invention relates to cold water paints and processes of making same; and it comprises as a new composition of matter, a dry powdery body, adapted to make a coating material upon the addition of water, and containing chemically combined sugar (sucrose) and lime (CaO) and, usually also containing a pigment, this combination being sufficiently free of water to allow the described powdery condition; and it also comprises a method of making such material wherein sugar, lime and water are dissolved in, and allowed to undergo reaction in the presence of, water and the mixture is afterward evaporated and dried sufficiently to allow its comminution to a dry powder, pigment being mixed with the material, if desired, either prior to the evaporation and powdering or subsequent thereto; all as more fully hereinafter set forth and as described.

For the purposes of this invention, a varnish is a liquid which on exposure to air on a surface coated therewith will "dry" to produce a solid protective film; and a paint is a varnish or "vehicle" mixed with pigment; a pigment being understood to be a fine inert powder, white or colored. A cold water paint is a dry pulverulent mixture of pigment, which is often lime, with some carrier or vehicle which will dissolve in water to produce a vehicle drying down on exposure to form a filmiform mass holding the pigment in place. Most of the cold water paints now known are not adapted for use in exposed situations since the water-soluble material which forms the vehicle does not in general again lose its solubility on exposure to the air in drying and the dried film disintegrates when it becomes moist. Glue, casein and gum arabic are frequently proposed vehicle-forming materials. These bodies in addition to permanently retaining their solubility in water have the disadvantage that they do not well withstand admixture with lime. Lime itself is often used as a coating material in "whitewashing;" but it does not form a coating which is water proof and weather proof; nor does it adhere strongly to wood or metal. On exposure to air caustic lime is rapidly converted into calcium carbonate; and the carbonate has very little binding power in coatings of this nature.

In the present invention I provide a type of cold water varnish or paint free of the noted objections and capable of use in conjunction with lime. In so doing I take advantage of the properties of a combination of sucrose (cane sugar or beet sugar) with lime; a combination which I may term calcium sucrate for convenience without thereby implying it necessarily to contain sucrose and calcium oxid (lime) in any particular molecular proportion.

I have found that by mixing lime, sugar and water together at a low temperature and then evaporating and drying also at a low temperature, I can produce a dry preparation yielding an excellent varnish or paint vehicle with water. On application to a surface of stone, wood or metal and drying in the air a film is obtained which is waterproof and resistant to the atmosphere. Its properties depend in a measure on the method of preparation. In general it may be said that the more water is used in the original mixing, that is the more dilute the solution is, the better is the resultant varnish material; but there is a limit to the amount in the fact that all the added water must subsequently be evaporated and evaporation and drying particularly at low temperatures, are difficult. The mixture is rather sticky and gummy and constant stirring is necessary during evaporation to prevent local over-heating and discoloration. Over-heating produces yellow to brown color. Temperatures below, say 280° F. are tolerably safe with a pure sugar. Impure sugars contain glucose or invert sugar and the greater the proportion of these bodies or of other impurities present in the sugar, the less is the permissible temperature. For evaporation I recommend vacuum apparatus provided with powerful stirring and comminuting means; but ordinary steam jacketed kettles may be used. The greater the vacuum used of course the lower is the temperature necessary in evaporation and drying.

With about 7 parts of cane sugar or beet sugar to 4 parts of good quicklime in fine powder and about 100 parts of water a good composition may be produced. In mixing, the temperature is best kept under 50° F., higher temperatures interfering with the desired chemical union of sugar and lime in forming sucrate. Vigorous agitation is necessary. After the composition becomes homogeneous, it may then be evaporated and dried at a low temperature in any convenient form of apparatus. It is quite sticky and gummy with the proportions of water given and evaporation is a matter of some difficulty. Active stirring during the evaporation is necessary and the stirring is best conducted by a mechanism having cutting edges. On drying a horny, elastic mass is formed. This may be reduced to a powder in a ball mill or any convenient form of disintegrator adapted for materials of this class. Material made in this manner, that is by drying down a sugar-lime solution at low temperatures to an extent sufficient to permit comminution and give a horny, elastic mass, remains soluble in water and is readily taken up thereby. On taking up with water the composition just mentioned gives a transparent solution which when used as a varnish dries down to a colorless transparent film. By increasing the sugar somewhat, taking say 7 parts of sugar to 3 parts of lime a similar composition is obtained with a higher gloss in the final varnish film. With higher proportions of sugar to lime than those stated, say 7:3, however, the varnish film will not be waterproof. The proportion of sugar may also be lowered. A composition of 4 parts sugar to 6 parts of lime gives a material which dries somewhat more readily in the first evaporation. The ground, dried material dissolves in water to form a varnish giving a film which is white and opaque. Intermediate proportions between those giving transparent films and those giving white films will of course give films more or less white and opalescent. If care is not taken during the evaporation of the mixture of sugar, lime and water the final varnish film will have a yellow color. Dark colors also result if low grade raw sugars are used. The more impure the sugar the greater is the necessity for a low temperature in evaporating the composition.

Varnish material made as stated after production of the dried comminuted substance may be mixed with pigments of any desired character. Using brown and red pigments discoloration during the evaporation of the first mixture is of course unimportant and so much care in evaporation is not necessary. Any amount of lime may be incorporated with this dried material. Fine ground limestone is a good white pigment to use with the present vehicle.

Where a paint material, as distinguished from a varnish material is desired it is usually more convenient to incorporate the pigment prior to the evaporation since the mass is then much easier to handle. Part or all of the pigment may be added to the preliminary water-lime-sugar mixture prior to evaporation.

As a rule it is better to use pigment particles of at least 100 mesh fineness. Paints may be made with the present material which will have a high gloss; but the more pigment is used with the calcium sucrate composition, the less is the gloss. In using lime or ground limestone as the pigment, colors may be imparted by the addition of the usual alkali-proof mortar colors.

In one specific embodiment of my invention producing a white cold water paint, 5 parts of sugar and 6 parts of quick-lime may be successively mixed with 100 parts of water, the temperature being kept below 50° F. during the operation. This mixture may then be evaporated and dried down to a consistency which will allow comminution when cold. With the fine powder produced may be admixed 11 parts of fine ground limestone and 55 parts of ordinary commercial, dry, hydrated lime. The whole operation is easier if the 11 parts of limestone and 55 parts of hydrate be mixed with the composition of water, sugar and quicklime prior to the evaporating stage. Made in either way, the final composition is a dry white powder which on addition of a small amount of water makes a paint which will spread easily and well; adhering well to wood, stone and metal. On drying it leaves a firm coating. Drying is quick. The paint will not rub off nor can it be washed off with water.

Another composition in the nature of a varnish may be made by mixing 6 parts of sugar, 4 parts of quicklime and 100 parts of water at a low temperature and evaporating to dryness. On fine grinding a powder is produced which on admixture with water gives a useful varnish. This varnish is rather sticky but has good covering capacity. It leaves a colorless, transparent film, which cannot be rubbed off. Drying is quick.

Instead of separately adding lime and sugar to water, evaporating at a low temperature to form a water-soluble horny material, comminuting, etc., the chemical combination of lime and sugar produced in sugar factories in extracting sugar from molasses and known as calcium sucrate may be used. The material as usually made has the composition of a tricalcium sucrate ($C_{12}H_{22}O_{11}.3CaO$), containing about 2 parts of sucrose (cane sugar or beet sugar) and 1 part of lime by weight.

What I claim is:—

1. As a new composition of matter, a dry fine powder adapted for coating purposes and comprising chemically combined sugar and lime in the form of horny elastic particles soluble in water.

2. As a new composition of matter, a dry fine powder adapted for coating purposes and comprising combined sugar and lime and also comprising a pigment.

3. As a new composition of matter, a dry white powder adapted for coating purposes and comprising sugar and lime in about the ratio of 4 to 7 parts of sugar to 3 parts of quick-lime, said sugar and lime being chemically combined.

4. As a new composition of matter, a dry white powder adapted for coating purposes and comprising sugar and lime in about the ratio of 4 to 7 parts of sugar to 3 parts of quick-lime, said sugar and lime being chemically combined and also comprising a pigment.

5. A cold water paint comprising a pulverulent mixture of chemically combined sugar and lime with calcium carbonate.

6. A cold water paint comprising a pulverulent mixture of chemically combined sugar and lime with calcium carbonate and hydrated lime.

7. The process of producing a coating material capable of use with water which comprises mixing water, lime and sugar at a low temperature, the ratio of sugar to lime being between 4 to 7 parts of sugar to 3 parts of lime, allowing reaction to take place at a low temperature and evaporating at a low temperature.

In testimony whereof, I affix my signature hereto.

WILLIAM E. CARSON.